(12) United States Patent
Kobayashi et al.

(10) Patent No.: US 6,744,957 B2
(45) Date of Patent: Jun. 1, 2004

(54) IMAGE FIBER IMAGING APPARATUS

(75) Inventors: Katsuhiro Kobayashi, Kanagawa-ken (JP); Yuichi Takenaga, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 77 days.

(21) Appl. No.: 10/133,074

(22) Filed: Apr. 26, 2002

(65) Prior Publication Data

US 2002/0159728 A1 Oct. 31, 2002

(30) Foreign Application Priority Data

Apr. 27, 2001 (JP) ........................................ 2001-132524

(51) Int. Cl.[7] .................................................. G02B 6/06
(52) U.S. Cl. ........................ 385/116; 385/115; 385/117; 385/118; 385/119
(58) Field of Search .................................. 385/115–119

(56) References Cited

U.S. PATENT DOCUMENTS

| | | | |
|---|---|---|---|
| 4,736,734 A | * 4/1988 | Matsuura et al. | 600/110 |
| 5,016,975 A | * 5/1991 | Sasaki et al. | 385/117 |
| 5,276,760 A | * 1/1994 | Yokota | 385/119 |
| 5,299,275 A | * 3/1994 | Jackson et al. | 385/116 |
| 5,394,499 A | * 2/1995 | Ono et al. | 385/119 |
| 6,663,560 B2 | * 12/2003 | MacAulay et al. | 600/160 |

FOREIGN PATENT DOCUMENTS

| | | | | |
|---|---|---|---|---|
| JP | 60241017 A | * 11/1985 | .......... | G02B/27/22 |
| JP | 02277016 A | * 11/1990 | .......... | G02B/23/26 |

* cited by examiner

Primary Examiner—Akm Enayet Ullah
Assistant Examiner—Daniel Petkovsek
(74) Attorney, Agent, or Firm—Pearne & Gordon LLP

(57) ABSTRACT

Herein disclosed is an image fiber imaging apparatus comprising an image guide fiber bundle having a plurality of optical fibers, a receiving end, at which one ends of said optical fibers are arranged, and a transmitting end, at which other ends of said optical fibers are arranged, said receiving end being directed to an object to receive an image of said object, said optical fibers transmitting said image received at said receiving end to said transmitting end, said image including a plurality of image portions, each corresponding to one of said optical fibers; a solid-state imaging device arranged at said transmitting end of said image guide fiber bundle for converting said image including a plurality of image portions transmitted by said optical fibers of said image guide fiber bundle into an image signal; an electrical spatial filter for filtering said image signal converted by said solid-state imaging device to output a filtered image signal; and a display unit for displaying said filtered image signal outputted by said electrical spatial filter.

8 Claims, 4 Drawing Sheets

IMAGE FIBER IMAGING APPARATUS

BACKGROUND OF THE INVENTION

1. Field of the Invention

The present invention relates to an image fiber imaging apparatus comprising an image guide fiber bundle, such as a fiber scope, having a receiving end and a transmitting end, for receiving an image of an object at the receiving end and transmitting through and outputting the image at the transmitting end, an imaging device for picking up the image transmitted and outputted by the image guide fiber bundle, and a display unit for displaying the image picked up by the imaging device.

2. Description of the Related Art

In recent years, there are provided a wide variety of image fiber imaging apparatuses each of which comprising an image guide fiber bundle such as, for example, a fiber scope, having a receiving end and a transmitting end, for receiving an image of an object placed at the receiving end, and transmitting and outputting the image at the transmitting end, a solid-state imaging device for picking up the image transmitted through and outputted by the image guide fiber bundle, and a display unit for displaying the image picked up by the solid-state imaging device. The image guide fiber bundle includes a plurality of optical fibers regularly arranged in a certain manner. The image includes a plurality of image portions. The image portions collectively forming the image received by the image guide fiber bundle at the receiving end respectively enter into optical fibers collectively forming the image guide fiber bundle. More specifically, each of the optical fibers has core and clad portions. The core portion is an inner, light-guiding part of the optical fiber and the clad portion is a part surrounding the core portion. An image portion received by the image guide fiber bundle enters the core portion of an optical fiber at an angle. The fact that the refractive index of the core portion is higher than that of the clad portion leads to the fact that an image portion that enters the core portion at an angle can reflect off the boundary between the core and clad portions and propagate down the length of the optical fiber.

The core and clad portions in the regularly arranged optical fibers, however, generate dark and bright patterns in light passing through the optical fibers, thereby causing the image guide fiber bundle to output the image containing the dark and bright pattern noises at the transmitting end. The dark and bright pattern noises thus outputted will result in mesh patterns appeared in the display unit. Furthermore, the solid-state imaging device includes a plurality of light receiving elements regularly arranged in a certain manner. The regularly arranged light receiving elements interfere with the image containing the dark and bright pattern noises transmitted through and outputted at the transmitting end of the image guide fiber bundle, thereby causing Moire patterns appeared in the display unit.

Up until now, there have been proposed a wide variety of image fiber imaging apparatuses each comprising an optical lowpass filter between the image guide fiber bundle and the solid-state imaging device, in order to reduce the dark and bright patterns and Moire patterns appeared in the display unit. One typical type of such image fiber imaging apparatus is disclosed in Japanese Patent Application Laid-Open Publication No. 136813/1990.

Referring to FIG. 4 of the drawing, there is shown a conventional image fiber imaging apparatus. The conventional image fiber imaging apparatus is shown in FIG. 4 as comprising a fiber scope 12, an optical coupler 13, an optical lowpass filter 14, a solid-state imaging device 2, a camera control unit 3, and a television monitor 5. The fiber scope 12 includes a plurality of optical fibers 1. The fiber scope 12 including a plurality of optical fibers 1 is adapted to receive and transmit an image of an object. The optical lowpass filter 14 is adapted to filter the image transmitted by the fiber scope 12 by compressing high frequency components in the image. The optical coupler 13 is placed between the fiber scope 12 and the optical lowpass filter 14 and adapted to optically couple the fiber scope 12 with the optical lowpass filter 14 in an appropriate manner. The solid-state imaging device 2 is adapted to pick up and convert the image filtered by the optical lowpass filter 14 into an image signal. The camera control unit 3 and the television monitor 5 are adapted to display the image signal thus picked up and converted by the solid-state imaging device 2.

The aforesaid conventional image fiber imaging apparatus comprising an image guide fiber bundle 12, however, encounters a drawback that the conventional image fiber imaging apparatus is i to be equipped with an optical lowpass filter 14, which is expensive and large in size, in order to reduce the dark and bright patterns and Moire patterns appeared in the display unit. Furthermore, the optical lowpass filter 14 is required to be selected in accordance with the line thickness and density of the image guide fiber bundle 12.

In the conventional image fiber imaging apparatus, the image guide fiber bundle 12 is replaceable with a relay lens. The conventional fiber imaging apparatus comprising a relay lens in place of the image guide fiber bundle 12 encounters another drawback that the optical lowpass filter 14 has frequency characteristics appropriate for reducing the dark and bright patterns and Moire patterns caused by image guide fiber bundle 12 and the solid-state imaging device 2 originally equipped, thereby impossible to reduce the dark and bright patterns and Moire patterns appeared in the display unit 5 and achieve a high resolution unless the optical lowpass filter 14 is replaced or adjusted in accordance with the frequency characteristics of the relay lens newly replaced.

The present invention contemplates resolution of such problems.

SUMMARY OF THE INVENTION

It is, therefore, an object of the present invention to provide an image fiber imaging apparatus comprising an image guide fiber bundle, which achieves a high resolution, effectively reducing the dark and bright patterns and Moire patterns appeared in a display and eliminates the needs of an optical lowpass filter, which is expensive and large in size, thereby making it possible to manufacture an high-performance image fiber imaging apparatus simple in structure at a low cost.

It is another object of the present invention to provide an image fiber imaging apparatus comprising a relay lens in place of an image guide fiber bundle, which achieves a high resolution, effectively reducing the dark and bright patterns and Moire patterns appeared in a display and eliminates the needs of an optical lowpass filter, which is expensive and large in size, thereby making it possible to manufacture an high-performance image fiber imaging apparatus simple in structure at a low cost.

In accordance with a first aspect of the present invention, there is provided an image fiber imaging apparatus comprising: an image guide fiber bundle having a plurality of"

optical fibers, a receiving end, at which one ends of the optical fibers are arranged, and a transmitting end, at which other ends of the optical fibers are arranged, the receiving end being directed to an object to receive an image of the object, the optical fibers transmitting the image received at the receiving end to the transmitting end, the image including a plurality of image portions, each corresponding to one of the optical fibers; a solid-state imaging device arranged at the transmitting end of the image guide fiber bundle for converting the image including a plurality of image portions transmitted by the optical fibers of the image guide fiber bundle into an image signal; an electrical spatial filter for filtering the image signal converted by the solid-state imaging device to output a filtered image signal; and a display unit for displaying the filtered image signal outputted by the electrical spatial filter.

The aforesaid electrical spatial filter may include: a central image signal portion selecting unit for sequentially selecting a central image signal portion and peripheral image signal portions from among the image signal portions converted by the solid-state imaging device; a comparing unit for inputting the central image signal portion and the peripheral image signal portions selected by the central image signal portion selecting unit, respectively calculating differences of the peripheral image signal portions between the value of the central image signal portion and the values of the peripheral image signal portions, and respectively comparing the differences of the peripheral image signal portions thus calculated with a predetermined threshold value to determine peripheral image signal portions, the differences of which are less than the threshold value, as valid peripheral image signal portions and peripheral image signal portions, the differences of which are not less than the threshold value, as invalid peripheral image signal portions; and a replacing unit for calculating the average value of the valid peripheral image signal portions determined by the comparing unit, replacing the value of the central image signal portion with the average value of valid peripheral image signal portions thus calculated, and outputting the central image signal portion thus replaced as a filtered central image signal portion, whereby the central image signal portion selecting unit is operative to select a plurality of central image signal portions one after another, and the replacing unit is operative to sequentially output the central image signal portions thus replaced as filtered central image signal portions forming a filtered image signal.

Attentively, the aforesaid electrical spatial filter may include: a central image signal portion selecting unit for sequentially selecting a central image signal portion and peripheral image signal portions from among the image signal portions converted by the solid-state imaging device; a comparing unit for inputting the central image signal portion and the peripheral image signal portions selected by the central image signal portion selecting unit, respectively calculating differences of the peripheral image signal portions between the value of the central image signal portion and the values of the peripheral image signal portions, and respectively comparing the differences of the peripheral image signal portions thus calculated with a predetermined threshold value to determine peripheral image signal portions, the differences of which are greater than the threshold value, as valid peripheral image signal portions and peripheral image signal portions, the differences of which are not greater than the threshold value, as invalid peripheral image signal portions; and a replacing unit for calculating the average value of the valid peripheral image signal portions determined by the comparing unit, replacing the value of the central image signal portion with the average value of valid peripheral image signal portions thus calculated, and outputting the central image signal portion thus replaced as a filtered central image signal portion whereby the central image signal portion selecting unit is operative to select a plurality of central image signal portions one after another, and the replacing unit is operative to sequentially output the central image signal portions thus replaced as filtered central image signal portions forming a filtered image signal. The aforesaid threshold value may be adjustable in accordance with the characteristics of the solid-state imaging device and the image guide fiber bundle.

In accordance with a second aspect of the present invention, the aforesaid replacing unit may includes: an adding unit for adding all the values of the valid peripheral image signal portions determined by the comparing unit to calculate a total value of the valid peripheral image signal portions; a counting unit for counting the number of the valid peripheral image signal portions determined by the comparing unit to calculate a total number of the valid peripheral image signal portions; and a dividing unit for dividing the total value of the valid peripheral image signal portions calculated by the adding unit by the total number of the valid peripheral image signal portions calculated by the counting unit, calculating an average value of the valid peripheral image signal portions, and outputting the average value of the valid peripheral image signal portions thus calculated as a filtered central image signal portion.

The aforesaid central image signal portion selecting unit may sequentially select a central image signal portion from among the image signal portions converted by the solid-state imaging device in accordance with an operating instruction.

In accordance with a third aspect of the present invention, the aforesaid electrical spatial filter may further includes an object area determining unit for determining an object area to be displayed in the display unit, the central image signal portion selecting unit is operative to sequentially select a central image signal portion from among the image signal portions converted by the solid-state imaging device in accordance with the object area determined by the object area determining unit.

In accordance with a fourth aspect of the present invention, the aforesaid image guide fiber bundle is replaceable with a relay lens for receiving an image of an object, and transmitting the image including a plurality of image portions, and the solid-state imaging device is operative to convert the image including a plurality of image portions transmitted by the relay lens.

BRIEF DESCRIPTION OF THE DRAWINGS

The features and advantages of the image fiber imaging apparatus according to the present invention will be more clearly understood from the following description taken in conjunction with the accompanying drawings in which.

DESCRIPTION OF THE PREFERRED EMBODIMENTS

The preferred embodiment of the image fiber imaging apparatus according to the present invention will be described hereinafter with reference to FIGS. 1 to 3.

Figure 1:
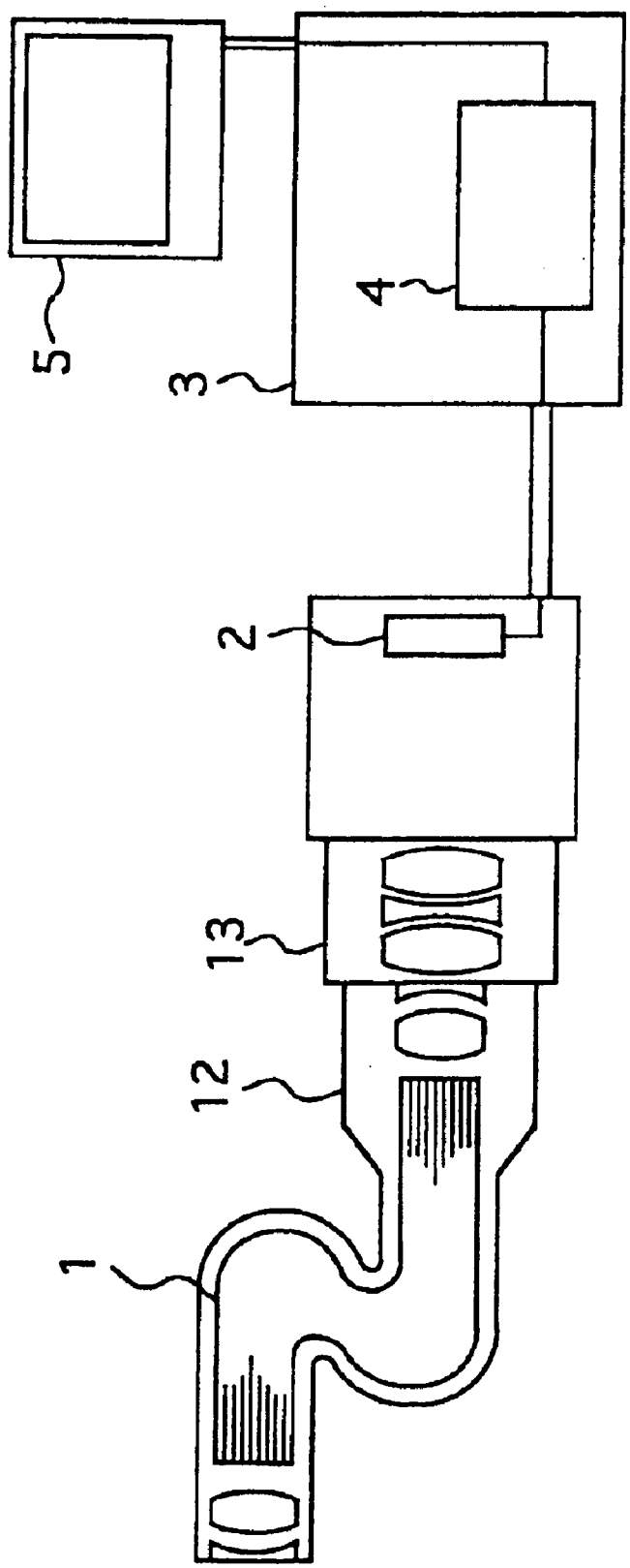
FIG. 1 is a block diagram showing an image fiber imaging apparatus according to the present invention.

Referring now to FIG. 1 of the drawings, there is shown a preferred embodiment of the image fiber imaging apparatus according to the present invention.

The image fiber imaging apparatus is shown in FIG. 1 as comprising: an image guide fiber bundle 12, an optical coupler 13, a solid-state imaging device 2, a camera control unit 3, and a display unit 5. The camera control unit 3 is equipped with an electrical spatial filter 4.

The image guide fiber bundle 12 has a plurality of optical fibers 1, a receiving end, and a transmitting end. One ends of the optical fibers 1 are arranged at the receiving end and other ends of the optical fibers 1 are arranged at the transmitting end of the image guide fiber bundle 12. The receiving end is directed to an object to receive an image of the object. The optical fibers 1 collectively forming the image guide fiber bundle 12 are adapted to transmit the image received at the receiving end to the transmitting end. The image includes a plurality of image portions, each corresponding to one of the optical fibers 1 collectively forming the image guide fiber bundle 12. The solid-state imaging device 2 is arranged at the transmitting end of the image guide fiber bundle 12 and is adapted to convert the image including a plurality of image portions transmitted by the optical fibers 1 collectively forming the image guide fiber bundle 12 into an image signal. There is provided an optical coupler 13 between the image guide fiber bundle 12 and the solid-state imaging device 2 and adapted to optically couple the image guide fiber bundle 12 with the solid-state imaging device 2. The optical coupler 13 is not directly related to the present invention. The description about the optical coupler is, therefore, omitted.

The electrical spatial filter 4 is adapted to filter the image signal converted by the solid-state imaging device 2 to output a filtered image signal. The display unit 5 is adapted to display the filtered image signal thus filtered by the electrical spatial filter 4.

The operation of the image guide fiber imaging apparatus according to the present invention will be described hereinlater.

The optical fibers 1 collectively forming the image guide fiber bundle 12 are operated to transmit the image received at the receiving end to the transmitting end. The solid-state imaging device 2 is operated to convert the image including a plurality of image portions transmitted by the optical fibers 1 collectively forming the image guide fiber bundle 12 into an image signal including a plurality of image signal portions. The electrical spatial filter 4 is operated to filter the image signal converted by the solid-state imaging device 2 to output a filtered image signal. The display unit 5 is operated to display the filtered image signal portions thus filtered by the electrical spatial filter 4.

Figure 3:
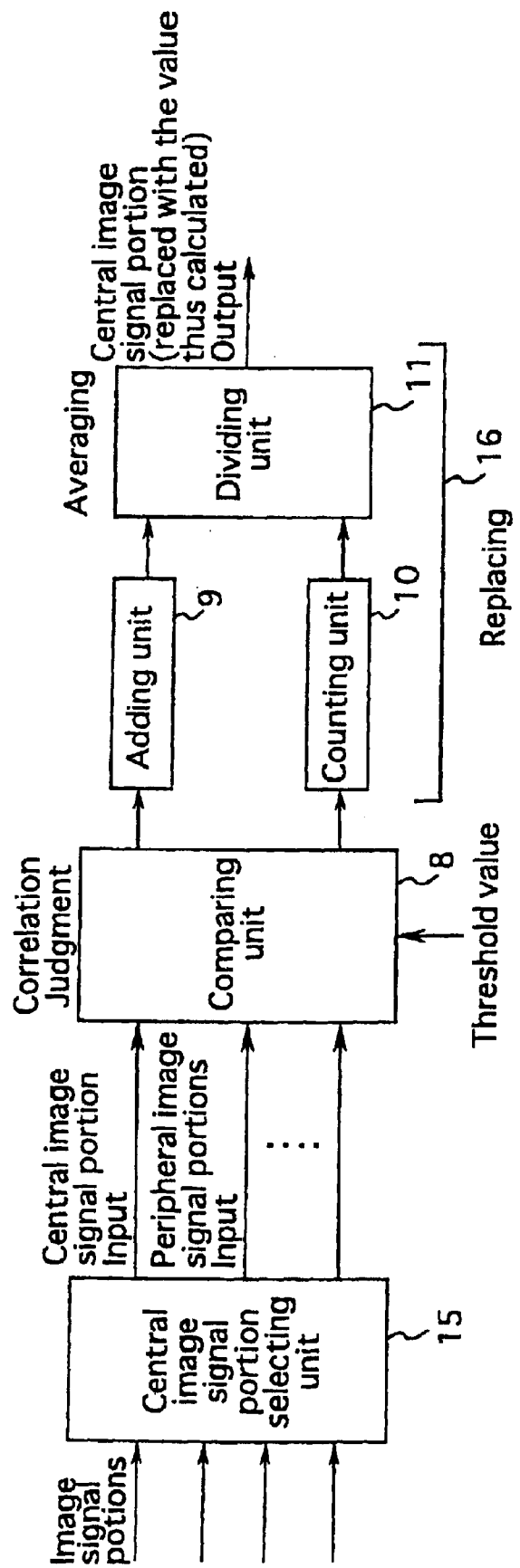
FIG. 3. is a block diagram showing an electrical spatial filter 4 forming part of the image fiber imaging apparatus shown in FIG. 1.
Figure 4:
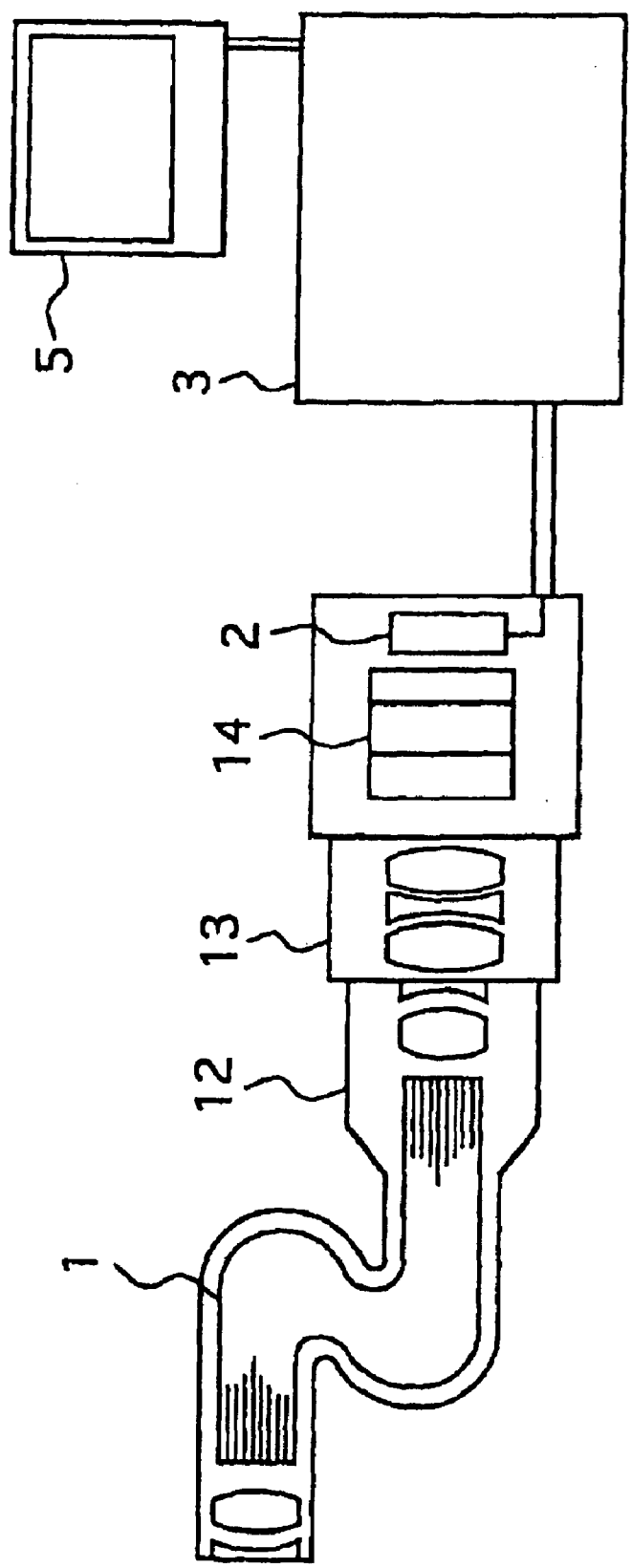
FIG. 4 is a block diagram showing a conventional image fiber imaging apparatus.

The description hereinlater will be directed to the electrical spatial filter 4 with reference to FIG. 3.

The electrical spatial filter 4 is shown in FIG. 3 as including a central image signal portion selecting unit 15, a comparing unit 8, and a replacing unit 16.

The image signal converted by the solid-state imaging device 2 includes a plurality of image signal portions each having a value. The value of an image signal portion may be, for example but not limited to, a value of Y component indicative of black and white proportion of the image signal portion, a value of any one or combination of Y, R–Y, B–Y components respectively indicative of luminance, red minus luminance, and blue minus luminance of the image signal portion, or a luminance of R, G, B component of the image signal portion. According to the present invention, the solid-state imaging device 2 may include a solid-state color imaging device.

The central image signal portion selecting unit 15 is operative to sequentially select a central image signal portion 6 and peripheral image signal portions 7 from among the image signal portions collectively forming the image signal converted by the solid-state imaging device 2.

The comparing unit 8 is operative to input the central image signal portion 6 and the peripheral image signal portions 7 selected by the central image signal portion selecting unit 15. The comparing unit 8 is then operative to respectively calculate differences of the peripheral image signal portions 7 between the value of the central image signal portion 6 and the values of the peripheral image signal portions 7. The peripheral image signal portions 7 are designated by, for example, peripheral image signal portions 7-1, 7-2, . . . 7-n in turn, wherein n is an integer. A difference of a peripheral image signal portion 7-i is intended to mean the difference between the value of the central image signal portion 6 and the value of the peripheral image signal portion 7-i, wherein i is an integer not greater than n. This means that the comparing unit 8 is firstly operative to calculate a difference of a first peripheral image signal portion 7-1 between the value of the central image signal portion 6 and the value of die first peripheral image signal portion 7-1, and then calculate a difference of a second peripheral image signal portion 7-2 between the value of the central image signal portion 6 and the value of the second peripheral image signal portions 7-2. This process of calculating a difference of an i-th peripheral image signal portion 7-i between the value of the central image signal portion 6 and the value of the i-th peripheral image signal portion 7-i will be repeated until the difference of the last peripheral image signal portion 7-n between the value of the central image signal portion 6 and the value of the last peripheral image signal portion 7-n is calculated, i.e., all of the differences of the peripheral image signal portions 7 are calculated.

The comparing unit 8 is operative to determine peripheral image signal portions 7 having strong correlations with the central image signal portion 6 in the following manner.

Figure 2:
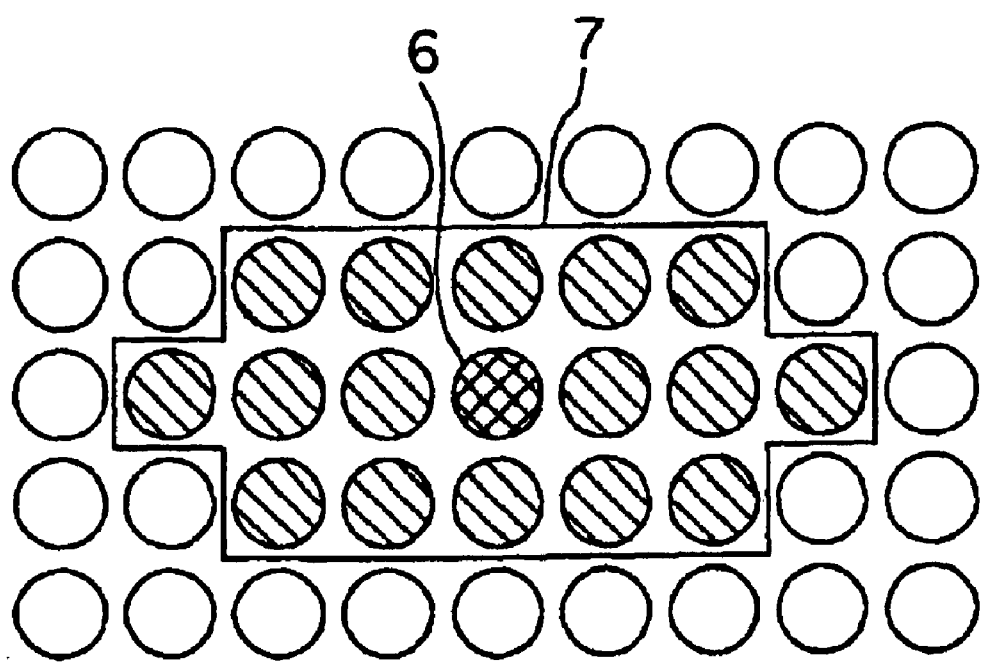
FIG. 2 is a block diagram explaining the process of filtering image signal portions performed by an electrical spatial filter 4 forming part of the image fiber imaging apparatus shown in FIG. 1.

The comparing unit 8 is operative to respectively compare the differences of the peripheral image signal portions 7 thus calculated with a predetermined threshold value to determine peripheral image signal portions 7, the differences of which are less than the threshold value, as valid peripheral image signal portions 7, and peripheral image signal portions 7, the differences of which are not less than the threshold value, as invalid peripheral image signal portions as best shown in FIG. 2. This means that the comparing unit 8 is operative to compare the difference of, for example, a first peripheral image signal portion 7-1 with a predetermined threshold value. When it is judged that the difference of the first peripheral image signal portion 7-1 is less than the threshold value, the comparing unit 8 is operative to determine that the first peripheral image signal portion 7-1 is a valid peripheral image signal portion. When, on the other hand, it is judged that the difference of a second peripheral image signal portion 7-2 is not less than the threshold value, the comparing unit 8 is operative to determine that the second peripheral image signal portion 7-2 is an invalid peripheral image signal portion. A valid peripheral image signal portion is intended to mean a peripheral image signal portion having a strong correlation with the central image signal portion 6. This process of determining valid and invalid peripheral image signal portions will be repeated until the last peripheral image signal portion 7-n is determined, ie, all of the peripheral image signal portions are determined.

The replacing unit 16 is operative to calculate the average value of the valid peripheral image signal portions 7 determined by the comparing unit 8. The replacing unit 16 is then operative to replace the value of the central image signal portion 6 with the average value of valid peripheral image signal portions 7 thus calculated, and output the central image signal portion 6 thus replaced as a filtered central image signal portion 6.

The replacing unit 16 will be described in detail hereinlater with reference to FIG. 3.

As best shown in FIG. 3, the replacing unit 16 includes: an adding unit 9, a counting unit 10, and a dividing unit 11.

The adding unit 9 is adapted to add all the values of the valid peripheral image signal portions 7 determined by the comparing unit 8 to calculate a total value of the valid peripheral image signal portions 7. The counting unit 10 is adapted to count the number of the valid peripheral image signal portions 7 determined by the comparing unit 8 to calculate a total number of the valid peripheral image signal portions 7.

The dividing unit 11 is adapted to divide the total value of the valid peripheral image signal portions 7 calculated by the adding unit 9 by the total number of the valid peripheral image signal portions 7 calculated by the counting unit 10, to calculate an average value of the valid peripheral image signal portions 7, and to output the average value of the valid peripheral image signal portions 7 thus calculated as a filtered central image signal portion 6.

The central image signal portion selecting unit 15 is operative to select a plurality of central image signal portions 6 one after another, and the replacing unit 16 is operative to sequentially calculate and output the central image signal portions 6 thus replaced as filtered central image signal portions 6 forming a filtered image signal.

The description hereinlater will be directed to the process of filtering image signal portions performed by the electrical spatial filter 4 including a central image signal portion selecting unit 15, a comparing unit 8, and a replacing unit 16 with reference to FIGS. 2 and 3.

The central image signal portion selecting unit 15 is operated to input image signal portions outputted by the solid-state imaging device 2 and sequentially select a central image signal portion 6 and peripheral image signal portions 7 from among the image signal portions collectively forming the image signal converted by the solid-state imaging device 2 as shown in FIG. 2.

The comparing unit 8 is operated to input the central image signal portion 6 and the peripheral image signal portions 7 selected by the central image signal portion selecting unit 15. The comparing unit 8 is then operated to respectively calculate differences of the peripheral image signal portions 7 between the value of the central image signal portion 6 and the values of the peripheral image signal portions 7. The peripheral image signal portions 7 are designated by, for example, peripheral image signal portions 7-1, 7-2, ... 7-n in turn, wherein n is an integer. A difference of a peripheral image signal portion 7-i is intended to mean the difference between the value of the central image signal portion 6 and the value of the peripheral image signal portion 7-i, wherein i is an integer not greater than n. This means that the comparing unit 8 is firstly operated to calculate a difference of a first peripheral image signal portion 7-1 between the value of the central image signal portion 6 and the value of the first peripheral image signal portion 7-1, and then calculate a difference of a second peripheral image signal portion 7-2 between the value of the central image signal portion 6 and the value of the second peripheral image signal portions 7-2. This process of calculating a difference of an i-th peripheral image signal portion 7-i between the value of the central image signal portion 6 and the value of the i-th peripheral image signal portion 7-i will be repeated until the difference of the last peripheral image signal portion 7-n between the value of the central image signal portion 6 and the value of the last peripheral image signal portion 7-n is calculated, i.e., all of the differences of the peripheral image signal portions 7 are calculated.

The comparing unit 8 is operated to respectively compare the differences of the peripheral image signal portions 7 thus calculated with a predetermined threshold value to determine peripheral image signal portions 7, the differences of which are less than the threshold value, as valid peripheral image signal portions 7, and peripheral image signal portions 7, the differences of which are not less than the threshold value, as invalid peripheral image signal portions.

This means that the comparing unit 8 is operated to compare the difference of, for example, a first peripheral image signal portion 7-1 with a predetermined threshold value. When it is judged that the difference of the first peripheral image signal portion 7-1, for example, is less than the threshold value, the comparing unit 8 is operated to determine that the first peripheral image signal portion 7-1 is a valid peripheral image signal portion. When, on the other hand, it is judged that the difference of a second peripheral image signal portion 7-2, for example, is not less than the threshold value, the comparing unit 8 is operated to determine that the second peripheral image signal portion 7-2 is an invalid peripheral image signal portion. This process of determining valid and invalid peripheral image signal portions will be repeated until the last peripheral image signal portion 7-n is determined, i.e, all of the peripheral image signal portions are determined.

The replacing unit 16 is operated to calculate the average value of the valid peripheral image signal portions 7 determined by the comparing unit 8. The replacing unit 16 is then operated to replace the value of the central image signal portion 6 with the average value of valid peripheral image signal portions 7 thus calculated, and output the value thus calculated, i.e., the central image signal portion 6 thus replaced as a filtered central image signal portion 6 as shown in FIG. 3.

The replacing unit 16 will be described in detail hereinlater with reference to FIG. 3.

As best shown in FIG. 3, the replacing unit 16 includes: an adding unit 9, a counting unit 10, and a dividing unit 11.

The adding unit 9 is operated to add all the values of the valid peripheral image signal portions 7 determined by the comparing unit 8 to calculate a total value of the valid peripheral image signal portions 7. The counting unit 10 is operated to count the number of the valid peripheral image signal portions 7 determined by the comparing unit 8 to calculate a total number of the valid peripheral image signal portions 7.

The dividing unit 11 is operated to divide the total value of the valid peripheral image signal portions 7 calculated by the adding unit 9 by the total number of the valid peripheral image signal portions 7 calculated by the counting unit 10, to calculate an average value of the valid peripheral image signal portions 7, and to output the average value of the valid peripheral image signal portions 7 thus calculated as a filtered central image signal portion 6.

The central image signal portion selecting unit 15 is operated to select a plurality of central image signal portions 6 one after another, and the replacing unit 16 is operated to sequentially output the central image signal portions 6 thus replaced as filtered central image signal portions 6 forming a filtered image signal.

The image fiber imaging apparatus according to the present invention, in which the comparing unit 8 determines a peripheral image signal portion as valid, i.e., having a strong correlation with a central image signal portion, if the difference between the central image signal portion and the peripheral image signal portion is less than a predetermined threshold value, and the replacing unit 16 calculates the average value of the valid peripheral image signal portions, and replaces the central image signal portion with the average value of the valid peripheral image signal portions thus calculated, can operate as an electrical spatial highpass filter. This means that the image fiber imaging apparatus thus constructed can damp low frequency components having dark and bright pattern noises generated by the core and clad portions in the regularly arranged optical fibers, and passing through high frequency components, thereby making it possible to maintain high-contrast components in the image such as the edge area of the object. This leads to the fact that the image fiber imaging apparatus thus constructed can reduce the bright and dark patterns and maintain the sharpness in the image appeared in the display unit 5.

In the image fiber imaging apparatus according to the present invention, the comparing unit 8, on the other hand, may determine peripheral image signal portions 7, the differences of which are greater than the threshold value, as valid peripheral image signal portions 7, and peripheral image signal portions 7, the differences of which are not greater than the threshold value, as invalid peripheral image signal portions. The description hereinlater will be directed to the operation of the image fiber imaging apparatus in which the comparing unit 8 is operative to determine peripheral image signal portions 7, the differences of which are greater than the threshold value, as valid peripheral image signal portions 7, and peripheral image signal portions 7, the differences of which are not greater than the threshold value, as invalid peripheral image signal portions. Here, the valid peripheral image signal portion 7 are intended to mean a peripheral image signal portion 7 having a weak correlation with a central image signal portion 7.

The central image signal portion selecting unit 15 is operated to sequentially select a central image signal portion 6 and peripheral image signal portions 7 from among the image signal portions converted by the solid-state imaging device 2.

The comparing unit 8 is operated to input the central image signal portion 6 and the peripheral image signal portions 7 selected by the central image signal portion selecting unit 15, respectively calculate differences of the peripheral image signal portions 7 between the value of the central image signal portion 6 and the values of the peripheral image signal portions 7 and compare the differences of the peripheral image signal portions 7 thus calculated with a predetermined threshold value.

The comparing unit 8 is then operated to determine peripheral image signal portions 7, the differences of which are greater than the threshold value, as valid peripheral image signal portions 7, and peripheral image signal portions 7, the differences of which are not greater than the threshold value, as invalid peripheral image signal portions.

The replacing unit 16 is operated to calculate the average value of the valid peripheral image signal portions 7 determined by the comparing unit 8, replace the value of the central image signal portion 6 with the average value of valid peripheral image signal portions 7 thus calculated, and output the central image signal portion 6 thus replaced as a filtered central image signal portion 6.

The central image signal portion selecting unit 15 is operative to select a plurality of central image signal portions 6 one after another, and the replacing unit 16 is operative to sequentially output the central image signal portions 6 thus replaced as filtered central image signal portions 6 forming a filtered image signal.

The image fiber imaging apparatus according to the present invention, in which the comparing unit 8 is operative to determine peripheral image signal portions 7, the differences of which are greater than the threshold value, as valid peripheral image signal portions 7, and peripheral image signal portions 7, the differences of which are not greater than the threshold value, as invalid peripheral image signal portions, can operate as an electrical spatial lowpass filter, thereby damping high frequency components which interfere with light receiving elements regularly arranged in the solid-state imaging device 2, likely causing Moire patterns appeared in the display unit 5.

In the image fiber imaging apparatus according to the present invention, the electrical spatial filter 4 is selectively operative as an electrical spatial highpass filter and as an electrical spatial lowpass filter. This means that the electrical spatial filter 4 can operate as an spatial highpass filter when the comparing unit 8 is set in a highpass filter mode to selectively determine peripheral image signal portions 7, the differences of which are less than the threshold value, as valid peripheral image signal portions 7, and peripheral image signal portions 7, the differences of which are not less than the threshold value, as invalid peripheral image signal portions, while, on the other hand, the electrical spatial filter 4 can operate as an spatial lowpass filter when the comparing unit 8 is set in a lowpass filter mode to determine peripheral image signal portions 7, the differences of which are greater than the threshold value, as valid peripheral image signal portions 7, and peripheral image signal portions 7, the differences of which are not greater than the threshold value, as invalid peripheral image signal portions. The comparing unit 8 may be set by, for example but not limited to an operator, in the lowpass filter mode or the highpass filter mode. As will be seen from the foregoing description, it is to be understood that the image fiber imaging apparatus according to the present invention, in which the electrical spatial filter 4 is selectively operative as a highpass filter and a lowpass filter, can achieve a high resolution, effectively reducing the dark and bright patterns and Moire patterns appeared in the display unit 5.

While it has been described in the above that the image fiber imaging apparatus according to the present invention comprises a solid-state imaging device 2, the image fiber imaging apparatus according to the present invention may comprise more than one solid-state device 2 in the same construction.

In the image fiber imaging apparatus according to the present invention, the electrical spatial filter 4 may partly include an optical lowpass filter.

In the image fiber imaging apparatus according to the present invention, the central image signal portion selecting unit 15 may sequentially select a central image signal portion from among the image signal portions converted by the solid-state imaging device 2 in accordance with an operating instruction. The operating instruction may be inputted to the central image signal portion selecting unit 15 by, for example but not limited to, an operator on the basis of information, the operator receives. The operator, for example, may firstly operate the image fiber imaging apparatus to display an image without placing any object to detect the areas in which the dark and bright patterns and Moire patterns appeared in the display unit 5 and input a focusing area operating instruction so that the central image signal portion selecting unit 15 sequentially selects a central image signal portion from among the image signal portions converted by the solid-state imaging device 2 focusing on the areas in which the dark and bright patterns and Moire patterns appears. The display unit 5 displays an image in a certain area of the display screen. This means the image in the remaining area of the display screen such as, for example, the four corner edge areas of the display screen, is not displayed in the display unit 5. The operator may input an area specifying operating instruction so that the central image signal portion selecting unit 15 sequentially selects a central image signal portion from among the image signal portions converted by the solid-state imaging device 2 focusing on the area in which the image is displayed in the screen of the display unit 5 excluding the remaining area in which the image is not displayed in the screen of the display unit 5.

The image fiber imaging apparatus according to the present invention, in which the central image signal portion selecting unit 15 is operative to sequentially select a central image signal portion from among the image signal portions converted by the solid-state imaging device 2 in accordance with an operating instruction, can filter the image signal only in the specified area. This means that the image fiber imaging apparatus thus constructed can reduce the amount of calculating operation performed by the electrical spatial filter 4, thereby effectively reducing the dark and bright patterns and Moire patterns appeared in a display and eliminates the needs of an optical lowpass fitter In the image fiber imaging apparatus according to the present invention, the electrical spatial filter 4 may further includes an object area determining unit (not shown) for determining an object area to be displayed in the display unit 5, and the central image signal portion selecting unit 15 may sequentially select a central image signal portion from among the image signal portions converted by the solid-state imaging device 2 in accordance with the object area determined by the object area determining unit. The object area determining unit may determine the object area to be displayed in the display unit 5 by means of, for example but not limited to, detecting motions, recognizing patterns, illuminations, colors, shapes, and etc. The image fiber imaging apparatus according to the present invention, in which the electrical spatial filter 4 may further includes an object area determining unit for determining an object area to be displayed in the display unit 5, and the central image signal portion selecting unit 15 may sequentially select a central image signal portion from among the image signal portions converted by the solid-state imaging device 2 in accordance with the object area determined by the object area determining unit, can automatically filter the image signal only in the specified area, reducing the amount of calculating operation performed by the electrical spatial filer 4, thereby effectively reducing the dark and bright patterns and Moire patterns appeared in a display and eliminates the needs of an optical lowpass filter.

In the image fiber imaging apparatus according to the present invention, the threshold value should be, preferably, adjustable in accordance with the characteristics of the image guide fiber bundle 12 and the solid-state imaging device 2, such as, for example, the line thickness and density of the core and clad portions of the optical fibers 1 forming the image guide fiber bundle 12 and the arrangement of the light receiving elements in the solid-state imaging device 2 so that the comparing unit 8 can accurately determine the peripheral image signal portions 7 having strong correlations with the central image signal portion 6 to effectively reduce the dark and bright patterns and Moiré patterns appeared in the display unit 5.

In the image fiber imaging apparatus according to the present invention, the image guide fiber bundle 12 is replaceable with a relay lens for receiving an image of an object, and transmitting the image including a plurality of image portions, the solid-state imaging device 2 is operative to convert the image including a plurality of image portions transmitted by the relay lens, the electrical spatial filter 4 is operative to filter the image signal converted by the solid-state imaging device 2 to output a filtered image signal, and the display unit 5 is operative to display the filtered image signal outputted by the electrical spatial filter 4. This means that the image fiber imaging apparatus according to the present invention, can comprise a relay lens in place of an image guide fiber bundle 12, and still achieves a high resolution, effectively reducing the dark and bright patterns and Moire patterns appeared in a display and eliminates the needs of an optical lowpass filter, which is expensive and large in size. This leads to the fact that the image fiber imaging apparatus according to the present invention makes it possible to manufacture an high-performance image fiber imaging apparatus simple in structure at a low cost.

From the foregoing description, it is to be understood that the image fiber imaging apparatus according to the present invention comprising an image fiber bundle 12 and the electrical spatial filter 4 can reduce Moiré patterns appeared in a display and eliminate the needs of an optical lowpass filter, which is expensive and large in size, thereby making it possible to manufacture an high-performance image fiber imaging apparatus simple in structure at a low cost.

From the foregoing description, it is to be understood that the image fiber imaging apparatus comprising a relay lens in place of an image guide fiber bundle 12, can achieves a high resolution, effectively reducing the dark and bright patterns and Moiré patterns appeared in a display unit 5 and eliminate the needs of an optical lowpass filter, which is expensive and large in size, thereby making it possible to manufacture an high-performance image fiber imaging apparatus simple in structure at a low cost.

It will be apparent to those skilled in the art and it is contemplated that variations and/or changes in the embodiments illustrated and described herein may be without departure from the present invention. Accordingly, it is intended that the foregoing description is illustrative only, not limiting, and that the true spirit and scope of the present invention will be determined by the appended claims.

What is claimed is:

1. An image fiber imaging apparatus comprising:
an image guide fiber bundle having a plurality of optical fibers, a receiving end, at which one ends of said optical fibers are arranged, and a transmitting end, at which other ends of said optical fibers are arranged, said receiving end being directed to an object to receive an image of said object, said optical fibers transmitting said image received at said receiving end to said transmitting end, said image including a plurality of image portions, each corresponding to one of said optical fibers;

a solid-state imaging device arranged at said transmitting end of said image guide fiber bundle for converting said image including a plurality of image portions transmitted by said optical fibers of said image guide fiber bundle into an image signal;

an electrical spatial filter for filtering said image signal converted by said solid-state imaging device to output a filtered image signal; and a display unit for displaying said filtered image signal outputted by said electrical spatial filter, in which said electrical spatial filter is selectively operative as a highpass filter and a lowpass filter.

2. An image fiber imaging apparatus as set forth in claim 1, in which said image guide fiber bundle is replaceable with a relay lens for receiving an image of an object, and transmitting said image including a plurality of image portions, and said solid-state imaging device is operative to convert said image including a plurality of image portions transmitted by said relay lens.

3. An image fiber imaging apparatus comprising:

an image guide fiber bundle having a plurality of optical fibers, a receiving end, at which one ends of said optical fibers are arranged, and a transmitting end, at which other ends of said optical fibers are arranged, said receiving end being directed to an object to receive an image of said object, said optical fibers transmitting said image received at said receiving end to said transmitting end, said image including a plurality of image portions, each corresponding to one of said optical fibers;

a solid-state imaging device arranged at said transmitting end of said image guide fiber bundle for converting said image including a plurality of image portions transmitted by said optical fibers of said image guide fiber bundle into an image signal;

an electrical spatial filter for filtering said image signal converted by said solid-state imaging device to output a filtered image signal; and a display unit for displaying said filtered image signal outputted by said electrical spatial filter, in which said electrical spatial filter is selectively operative as a highpass filter and a lowpass filter, said image signal including a plurality of said image signal portions each having a value, in which said electrical spatial filter operative as a highpass filter includes:

a central image signal portion selecting unit for sequentially selecting a central image signal portion and peripheral image signal portions from among said image signal portions converted by said solid-state imaging device, a comparing unit for inputting said central image signal portion and said peripheral image signal portions selected by said central image signal portion selecting unit, respectively calculating differences of said peripheral image signal portions between said value of said central image signal portion and said values of said peripheral image signal portions, and respectively comparing said differences of said peripheral image signal portions thus calculated with a predetermined threshold value to determine peripheral image signal portions, said differences which are less than said threshold value, as valid peripheral image signal portions and peripheral image signal portions, said differences of which are not less than said threshold value, as invalid peripheral image signal portions;

and a replacing unit for calculating the average value of said valid peripheral image signal portions determined by said comparing unit, replacing said value of said central image signal portion with the average value of valid peripheral image signal portions thus calculated, and outputting said central image signal portion thus replaced as a filtered central image signal portion, whereby said central image signal portion selecting unit operative to select a plurality of central image signal portions one after another, and said replacing unit operative to sequentially output said central image signal portions thus replaced as filtered central image signal portions forming a filtered image signal.

4. An image fiber imaging apparatus comprising:

an image guide fiber bundle having a plurality of optical fibers, a receiving end, at which one ends of said optical fibers are arranged, and a transmitting end, at which other ends of said optical fibers are arranged, said receiving end being directed to an object to receive an image of said object, said optical fibers transmitting said image received at said receiving end to said transmitting end, said image including a plurality of image portions, each corresponding to one of said optical fibers;

a solid-state imaging device arranged at said transmitting end of said image guide fiber bundle for converting said image including a plurality of image portions transmitted by said optical fibers of said image guide fiber bundle into an image signal;

an electrical spatial filter for filtering said image signal converted by said solid-state imaging device to output a filtered image signal; and a display unit for displaying said filtered image signal outputted by said electrical spatial filter, in which said electrical spatial filter is selectively operative as a highpass filter and a lowpass filter, each of which image signal portions having a value, in which said electrical spatial filter operative as a lowpass filter includes:

a central image signal portion selecting unit for sequentially selecting a central image signal portion and peripheral image signal portions from among said image signal portions converted by said solid-state imaging device;

a comparing unit for inputting said central image signal portion and said peripheral image signal portions selected by said central image signal portion selecting unit, respectively calculating differences of said peripheral image signal portions between said value of said central image signal portion and said values of said peripheral image signal portions, and respectively comparing said differences of said peripheral image signal portions thus calculated with a predetermined threshold value to determine peripheral image signal portions, said differences of which are greater than said threshold value, as valid peripheral image signal portions and peripheral image signal portions, said differences of which are not greater than said threshold value, as invalid peripheral image signal portions; and a replacing unit for calculating the average value of said valid peripheral image signal portions determined by said comparing unit, replacing said value of said central image signal portion with the average value of valid peripheral image signal portions thus calculated, and outputting said central image signal portion thus replaced as a filtered central image signal portion whereby said central image signal portion selecting unit is operative to select a plurality of central image signal portions one after another, and said replacing unit is operative to sequentially output said central image signal portions thus replaced as filtered central image signal portions forming a filtered image signal.

5. An image fiber imaging apparatus as set forth in claim 3 or 4, in which said replacing unit includes:

an adding unit for adding all the values of said valid peripheral image signal portions determined by said comparing unit to calculate a total value of said valid peripheral image signal portions;

a counting unit for counting the number of said valid peripheral image signal portions determined by said comparing unit to calculate a total number of said valid peripheral image signal portions; and a dividing unit for dividing said total value of said valid peripheral image signal portions calculated by said adding unit by said total number of said valid peripheral image signal portions calculated by said counting unit, calculating an average value of said valid peripheral image signal portions, and outputting said average value of said valid peripheral image signal portions thus calculated as a filtered central image signal portion.

6. An image fiber imaging apparatus as set forth in claim 5, in which said central image signal portion selecting unit is operative to sequentially select a central image signal portion from among said image signal portions converted by said solid-state imaging device in accordance with an operating instruction.

7. An image fiber imaging apparatus as set forth in claim 5, in which said electrical spatial filter further includes an object area determining unit for determining an object area to be displayed in said display unit, said central image signal portion selecting unit is operative to sequentially select a central image signal portion from among said image signal portions converted by said solid-state imaging device in accordance with said object area determined by said object area determining unit.

8. An image fiber imaging apparatus as set forth in claim 3 or 4, in which said threshold value is adjustable in accordance with the characteristics of said solid-state imaging device and said image guide fiber bundle.

* * * * *

UNITED STATES PATENT AND TRADEMARK OFFICE
CERTIFICATE OF CORRECTION

PATENT NO. : 6,744,957 B2
DATED : June 1, 2004
INVENTOR(S) : Katsuhiro Kobayashi et al.

It is certified that error appears in the above-identified patent and that said Letters Patent is hereby corrected as shown below:

Column 3,
Line 47, please delete "Attentively" and insert therefor -- Alternatively --.

Signed and Sealed this

Sixteenth Day of November, 2004

JON W. DUDAS
*Director of the United States Patent and Trademark Office*